United States Patent
Lee et al.

(10) Patent No.: US 10,231,191 B2
(45) Date of Patent: Mar. 12, 2019

(54) INTERFERENCE ALLEVIATION METHOD AND APPARATUS PERFORMED BY BASE STATION IN WIRELESS COMMUNICATIONS SYSTEM

(71) Applicant: LG ELECTRONICS INC., Seoul (KR)

(72) Inventors: Seungmin Lee, Seoul (KR); Yunjung Yi, Seoul (KR); Kijun Kim, Seoul (KR); Manyoung Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/736,604

(22) PCT Filed: Jun. 16, 2016

(86) PCT No.: PCT/KR2016/006422
§ 371 (c)(1),
(2) Date: Dec. 14, 2017

(87) PCT Pub. No.: WO2016/204542
PCT Pub. Date: Dec. 22, 2016

(65) Prior Publication Data
US 2018/0167892 A1    Jun. 14, 2018

Related U.S. Application Data

(60) Provisional application No. 62/180,079, filed on Jun. 16, 2015.

(51) Int. Cl.
*H04W 52/24* (2009.01)
*H04L 5/00* (2006.01)
(Continued)

(52) U.S. Cl.
CPC .......... *H04W 52/243* (2013.01); *H04L 5/001* (2013.01); *H04L 25/03* (2013.01); *H04W 52/14* (2013.01);
(Continued)

(58) Field of Classification Search
None
See application file for complete search history.

(56) References Cited

U.S. PATENT DOCUMENTS

2012/0263117 A1* 10/2012 Love .................. H04L 5/003
370/329
2013/0343217 A1* 12/2013 Pan .................... H04W 72/082
370/252
(Continued)

FOREIGN PATENT DOCUMENTS

WO    2013170188    11/2013
WO    2015006940    1/2015

OTHER PUBLICATIONS

3GPP TS 36.211 V8.7.0, May 2009.

*Primary Examiner* — Mohammed Rachedine
(74) *Attorney, Agent, or Firm* — Dentons US LLP

(57) ABSTRACT

Provided are an interference alleviation method performed by a first base station in a wireless communications system comprising the first base station and a second base station using adjacent resources, and an apparatus using the method. The method is characterized by obtaining an uplink-downlink configuration applied by the second base station, and determining different downlink transmission powers for a first subframe of the first base station, which overlaps a subframe in which the second base station performs downlink transmission, and for a second subframe of the first base station, which does not overlap said subframe.

11 Claims, 13 Drawing Sheets

(51) Int. Cl.
  *H04W 52/14*     (2009.01)
  *H04W 52/50*     (2009.01)
  *H04W 52/42*     (2009.01)
  *H04W 72/04*     (2009.01)
  *H04L 25/00*     (2006.01)
  *H04L 25/03*     (2006.01)

(52) U.S. Cl.
  CPC ......... *H04W 52/244* (2013.01); *H04W 52/42* (2013.01); *H04W 52/50* (2013.01); *H04W 72/0473* (2013.01)

(56) References Cited

U.S. PATENT DOCUMENTS

| | | |
|---|---|---|
| 2014/0133412 A1 | 5/2014 | Jeniston Deviraj et al. |
| 2014/0153454 A1 | 6/2014 | Samdanis et al. |
| 2014/0286201 A1* | 9/2014 | Sagae .................. H04L 5/0062 370/278 |
| 2015/0103706 A1 | 4/2015 | Li et al. |
| 2016/0157248 A1* | 6/2016 | Lin ....................... H04W 24/00 370/329 |

* cited by examiner

INTERFERENCE ALLEVIATION METHOD AND APPARATUS PERFORMED BY BASE STATION IN WIRELESS COMMUNICATIONS SYSTEM

CROSS-REFERENCE TO RELATED APPLICATIONS

This application is the National Stage filing under 35 U.S.C. 371 of International Application No. PCT/KR2016/006422, filed on Jun. 16, 2016, which claims the benefit of U.S. Provisional Application No. 62/180,079 filed on Jun. 16, 2015, the contents of which are all hereby incorporated by reference herein in their entirety.

BACKGROUND OF THE INVENTION

Field of the Invention

The present invention relates to wireless communication, and more particularly, to an interference alleviation method performed by a first base station in a wireless communication system including a first base station and a second base station using adjacent resources, and an apparatus using the method.

Related Art

Long-Term Evolution (LTE) is a mobile communication standard based on 3rd Generation Partnership Project (3GPP) Technical Specification (TS) Release 8, LTE-Advanced (LTE-A) is a mobile communication standard and an enhancement of the LTE standard.

LTE-A supports carrier aggregation in which a plurality of carriers is aggregated and set to be used for a single user equipment (UE). Carrier aggregation conventionally supports aggregation of frequency division duplex (FDD) cells using an FDD frame and aggregation of time division duplex (TDD) cells using a TDD frame only. However, carrier aggregation has also support aggregation of FDD cells and TDD cells and aggregation of TDD cells having different uplink-downlink configurations in recent years. An uplink-downlink configuration is setting information indicating which among an uplink subframe, a downlink subframe, and a special subframe each subframe in a TDD frame is.

A plurality of channels in the same frequency band may be positioned close or adjacent to each other on the frequency axis. Communications in different directions may be performed on the adjacent channels. For example, suppose that TDD cells using different uplink-downlink configurations are aggregated and at least two TDD cells are located in the same frequency band.

In this case, there may be a subframe in which one cell performs downlink transmission from a base station (BS) to a UE at a first frequency and another cell performs uplink transmission from a UE to a BS at a second frequency. If the first and second frequencies are adjacent or close to each other, the two transmissions cause interference to each other, thus deteriorating performance.

Such a problem may arise even not in a carrier aggregation situation. For example, when a first BS operated by a first operator and a second BS operated by a second operator perform communications in different directions in all or some of overlapping subframes, the communications cause interference to each other.

Thus, there is a need for a method for mitigating mutual interference between BSs or cells that perform communications in different directions using adjacent resources.

SUMMARY OF THE INVENTION

A technical aspect of the present invention is to provide an interference alleviation method performed by a base station in a wireless communication system, and an apparatus using the method.

In an aspect, provided is a method for alleviating, by a first base station (BS), interference in a wireless communication system comprising the first BS and a second BS that use adjacent resources. The method includes obtaining an uplink-downlink configuration applied by the second BS and determining downlink transmission power differently for a first subframe of the first BS, which overlaps a subframe used for the second BS to perform downlink subframe, and for a second subframe of the first BS, which does not overlap the subframe.

The first BS may perform uplink transmission in the first subframe.

The first BS may allocate lower uplink transmission power for the first subframe than for the second subframe to alleviate interference caused to the second BS.

The first BS may identify a subframe used for the second BS to perform uplink communication or downlink communication through the obtained uplink-downlink configuration applied by the second BS.

The method may further include identifying a particular subframe used for the second BS to perform uplink communication and setting an additional guard band in a downlink subframe of the first BS overlapping the particular subframe by adding some resources in a downlink system band to an existing guard band.

The method may further include identifying a particular subframe used for the second BS to perform downlink communication and setting an additional guard band in an uplink subframe of the first BS overlapping the particular subframe by adding some resources in an uplink system band to an existing guard band.

The first BS may provide a user equipment (UE) with information indicating a subframe in which an additional guard band is set.

The UE may perform measurement in the subframe in which the additional guard band is set, assuming that no cell-specific reference signal is allocated in the additional guard band.

In another aspect, provided is an apparatus. The apparatus includes a radio frequency (RF) unit to transmit and receive a radio signal and a processor connected to the RF unit. The processor obtains an uplink-downlink configuration applied by a second BS and determines downlink transmission power differently for a first subframe of the first BS, which overlaps a subframe used for the second BS to perform downlink subframe, and for a second subframe of the first BS, which does not overlap the subframe.

It is possible to alleviate interference occurring between base stations or cells performing communications in different directions using adjacent resources.

DESCRIPTION OF EXEMPLARY EMBODIMENTS

A user equipment (UE) may be fixed or mobile, and may be referred to as another terminology, such as a mobile station (MS), a mobile terminal (MT), a user terminal (UT), a subscriber station (SS), a wireless device, a personal digital assistant (PDA), a wireless modem, a handheld device, etc.

A base station (BS) is generally a fixed station that communicates with the UE and may be referred to as another terminology, such as an evolved Node-B (eNB), a base transceiver system (BTS), an access point, etc.

Communication from a BS to a UE is referred to as downlink (DL), and communication from a UE to a BS is referred to as uplink (UL). A wireless communication system including a BS and a UE may be a time division duplex (TDD) system, a frequency divisionduplex (FDD) system, or a hybrid system of TDD and FDD. The TDD system is a wireless communication system for performing UL and DL transmission/reception by using different times at the same frequency band. The FDD system is a wireless communication system capable of simultaneously performing UL and DL transmission/reception by using different frequency bands. The wireless communication system can perform communication by using a radio frame.

Figure 1:
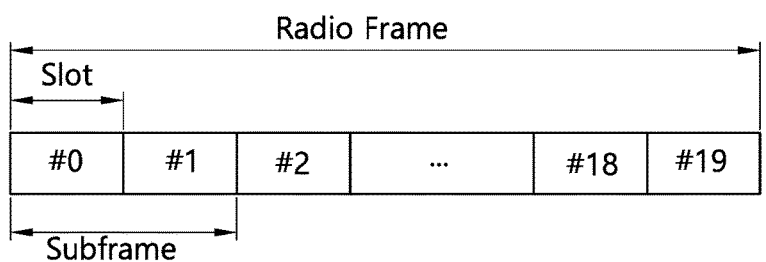
FIG. 1 shows a structure of a frequency division duplex (FDD) radio frame.

FIG. 1 shows a structure of an FDD radio frame.

The FDD radio frame (hereinafter, simply referred to as FDD frame) includes 10 subframes. One subframe includes two consecutive slots. Slots included in the radio frame are indexed from 0 to 19. A time required to transmit one subframe is defined as a transmission time interval (TTI). The TTI may be a minimum scheduling unit. For example, one subframe may have a length of 1 milliseconds (ms), and one slot may have a length of 0.5 ms. An FDD radio frame may include the same number of (for example, 10) uplink subframes and downlink subframes at different frequency bands.

Figure 2:
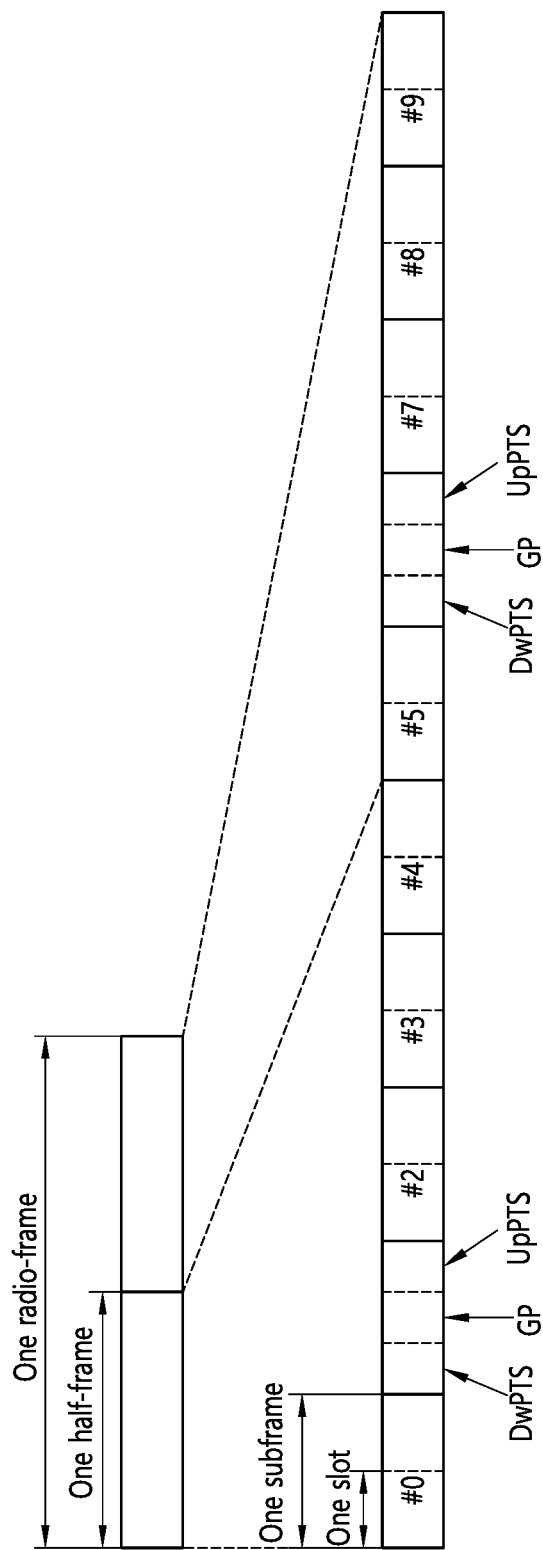
FIG. 2 shows a structure of a time division duplex (TDD) radio frame.

FIG. 2 shows a structure of a TDD radio frame.

Referring to FIG. 2, the TDD radio frame (hereinafter, TDD frame) includes 10 subframes. When subframes are indexed from 0 to 9, a subframe having an index #1 and an index #6 is called a special subframe (simply referred to as an S subframe), and includes a downlink pilot time slot (DwPTS), a guard period (GP), and an uplink pilot time slot (UpPTS). The DwPTS is used in a UE for initial cell search, synchronization, or channel estimation. The UpPTS is used in a BS for channel estimation and uplink transmission synchronization of the UE. The GP is a period for removing interference which occurs in an uplink due to a multi-path delay of a downlink signal between the uplink and a downlink.

In the TDD frame, a downlink (DL) subframe and an uplink (UL) subframe coexist. Table 1 below shows an example of a UL-DL configuration of a radio frame.

TABLE 1

| Uplink-downlink configuration | Downlink-to-Uplink Switch-point periodicity | Subframe n | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1 above, 'D' denotes a DL subframe, 'U' denotes a UL subframe, and 'S' denotes a special subframe. Upon receiving the UL-DL configuration from the BS, the UE can know whether each subframe is a DL subframe or a UL subframe in the TDD subframe. Hereinafter, a UL-DL configuration N (where N is any one value from 0 to 6) may use Table 1 above by reference.

Meanwhile, the special subframe may be any one of configurations shown in the following table.

TABLE 2

| | Normal CP (downlink) | | | Extended CP(downlink) | | |
|---|---|---|---|---|---|---|
| | | UpPTS | | | UpPTS | |
| Special subframe configuration | DwPTS | Normal CP (uplink) | Extended CP (uplink) | DwPTS | Normal CP (uplink) | Extended CP (uplink) |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | — | — | — |
| 8 | 24144 · $T_s$ | | | — | — | — |

In Table 2, $T_s$ has a relation of: $307200T_s=10$ ms(millisecond).

Figure 3:
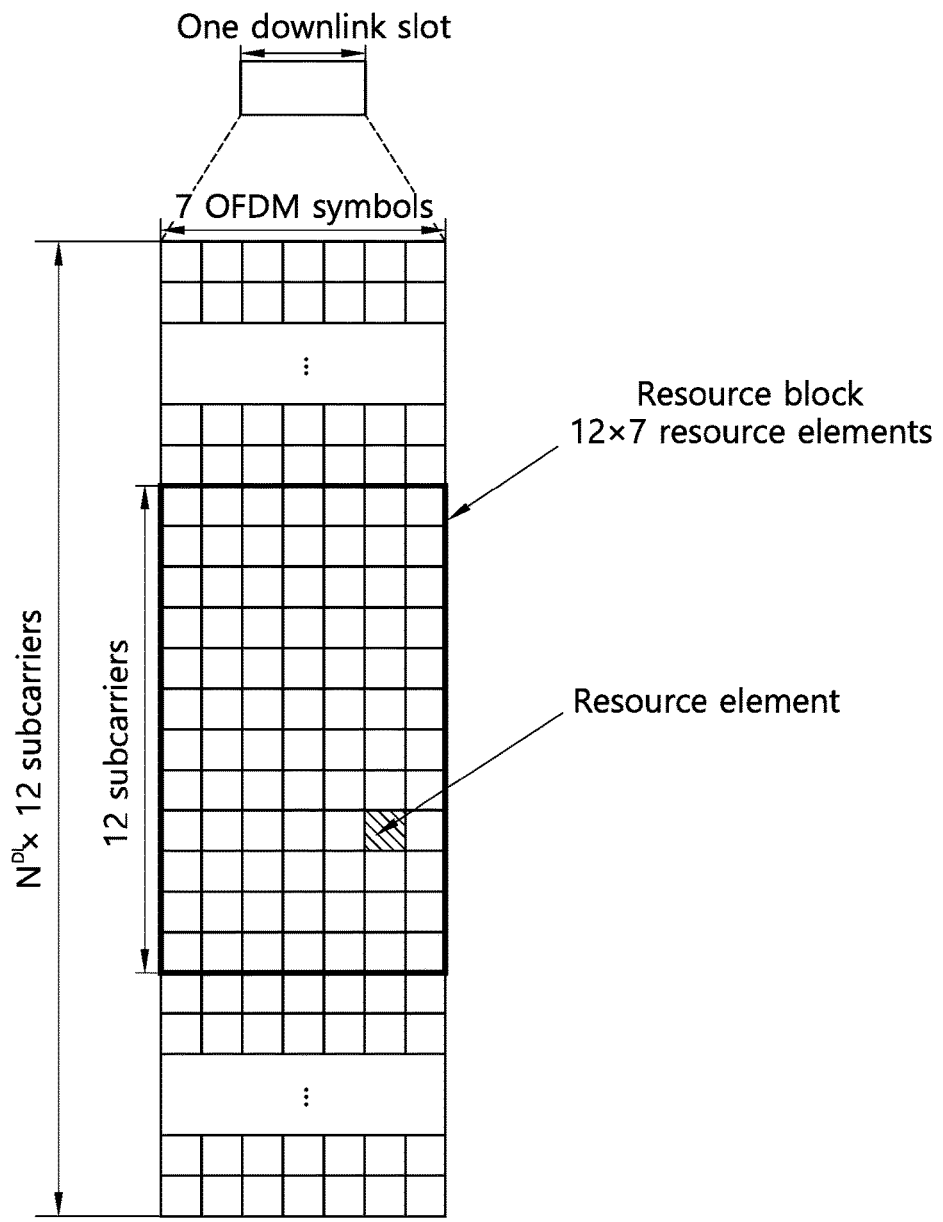
FIG. 3 shows an example of a resource grid for one downlink (DL) slot.

FIG. 3 shows an example of a resource grid for one DL slot.

Referring to FIG. 3, the DL slot includes a plurality of orthogonal frequency division multiplexing (01-DM) symbols in a time domain, and includes $N_{RB}$ resource blocks (RBs) in a frequency domain. The RB is a resource allocation unit, and includes one slot in the time domain and includes a plurality of subcarriers in the frequency domain. The number $N_{RB}$ of RBs included in the DL slot depends on a DL transmission bandwidth configured in a cell. For example, in the LTE system, $N_{RB}$ may be any one value in the range of 6 to 110. A structure of a UL slot may be the same as the aforementioned structure of the DL slot.

Each element on the resource grid is referred to as a resource element (RE). The RE on the resource grid can be identified by an index pair (k,l) within the slot. Herein, $k(k=0, \ldots, N_{RB} \times 12-1)$ denotes a subcarrier index in the frequency domain, and l ($l=0, \ldots, 6$) denotes an OFDM symbol index in the time domain.

Although it is described in FIG. 3 that one RB includes 7×12 REs consisting of 7 OFDM symbols in the time domain and 12 subcarriers in the frequency domain for example, the number of OFDM symbols and the number of subcarriers in the RB are not limited thereto. The number of OFDM symbols and the number of subcarriers may change variously depending on a cyclic prefix (CP) length, a frequency spacing, etc. The number of subcarriers in one OFDM symbol may be selected from 128, 256, 512, 1024, 1536, and 2048.

Figure 4:
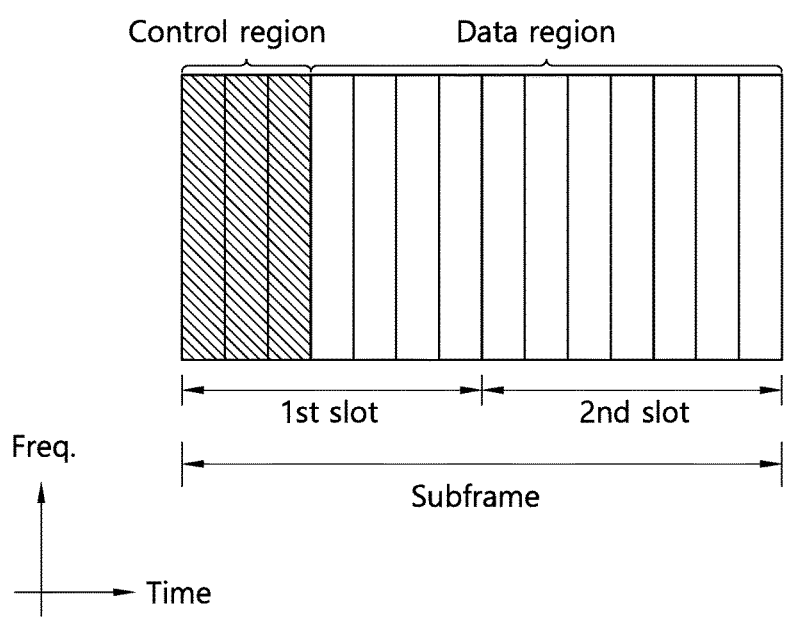
FIG. 4 shows a structure of a DL subframe.

FIG. 4 shows a structure of a DL subframe.

Referring to FIG. 4, the DL subframe is divided into a control region and a data region in the time domain. The control region includes up to first three (optionally, up to four) OFDM symbols of a $1^{st}$ slot in the subframe. However, the number of OFDM symbols included in the control region may vary. A physical downlink control channel (PDCCH) is allocated to the control region, and a physical downlink shared channel (PDSCH) is allocated to the data region.

As disclosed in 3GPP TS 36.211 V8.7.0, the 3GPP LTE classifies a physical channel into a data channel and a control channel Examples of the data channel include a physical downlink shared channel (PDSCH) and a physical uplink shared channel (PUSCH). Examples of the control channel include a physical downlink control channel (PDCCH), a physical control format indicator channel (PCFICH), a physical hybrid-ARQ indicator channel (PHICH), and a physical uplink control channel (PUCCH).

A physical control format indicator channel (PCFICH) transmitted in a $1^{st}$ OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH. Unlike the PDCCH, the PCFICH does not use blind decoding, and is transmitted by using a fixed PCFICH resource of the subframe.

A physical hybrid-ARQ indicator channel (PHICH) carries a positive-acknowledgement (ACK)/negative-acknowledgement (NACK) signal for an uplink hybrid automatic repeat request (HARQ). The ACK/NACK signal for UL data on a PUSCH transmitted by the UE is transmitted on the PHICH.

A physical broadcast channel (PBCH) is transmitted in first four OFDM symbols in a $2^{nd}$ slot of a $1^{st}$ subframe of a radio frame. The PBCH carries system information necessary for communication between the UE and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a DL grant), resource allocation of a PUSCH (this is referred to as a UL grant), a set of transmit power control commands for individual UEs in any UE group, and/or activation of a voice over Internet protocol (VoIP).

Figure 5:
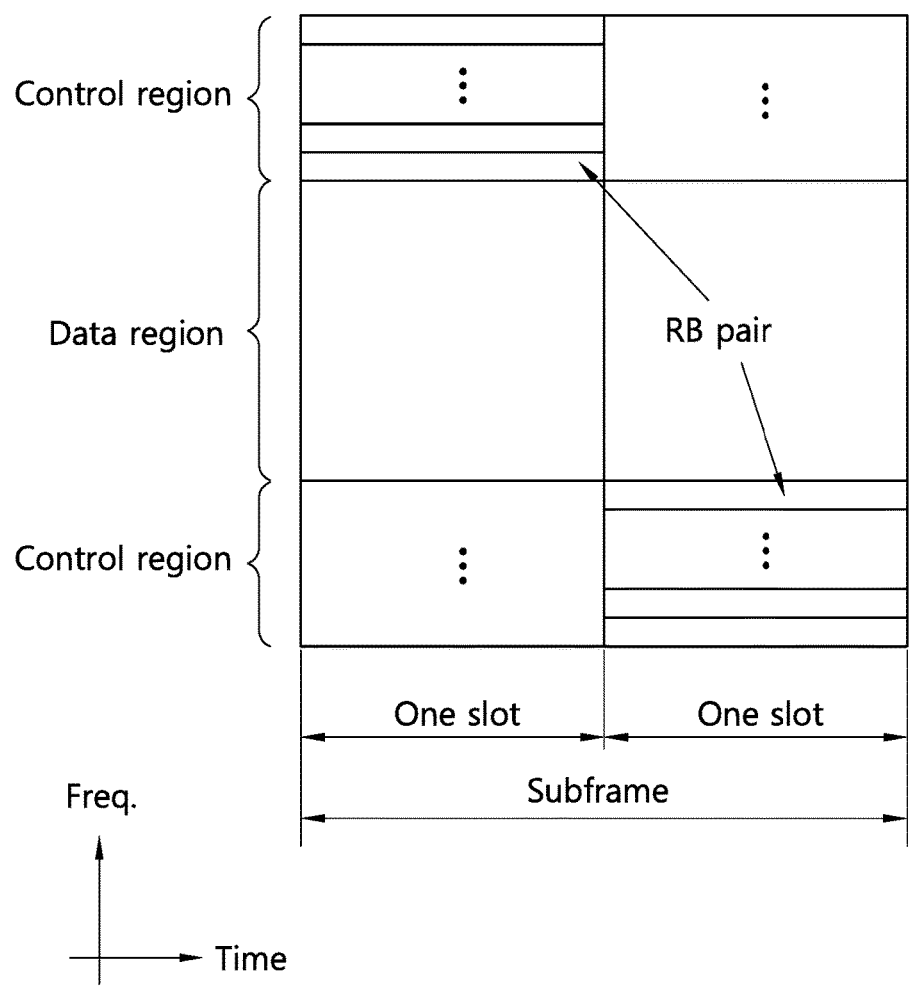
FIG. 5 shows a structure of an uplink (UL) subframe.

FIG. 5 shows a structure of a UL subframe.

Referring to FIG. 5, the UL subframe may be divided into a control region and a data region in a frequency domain. The control region is a region to which a physical uplink control channel (PUCCH) carrying UL control information is allocated. The data region is a region to which a physical uplink shared channel (PUSCH) carrying user data is allocated.

The PUCCH is allocated in an RB pair in a subframe. RBs belonging to the RB pair occupy different subcarriers in each of a $1^{st}$ slot and a $2^{nd}$ slot. The RB pair has the same RB index m.

Meanwhile, the PUCCH supports multiple formats. A PUCCH having a different number of bits per subframe may be used according to a modulation scheme which is dependent on the PUCCH format.

Table 3 below shows an example of a modulation scheme and the number of bits per subframe according to the PUCCH format.

TABLE 3

| PUCCH format | Modulation scheme | Number of bits per subframe |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + QPSK | 22 |

The PUCCH format 1 is used for transmission of a scheduling request (SR). The PUCCH formats 1a/1b are used for transmission of an ACK/NACK signal. The PUCCH format 2 is used for transmission of a CQI. The PUCCH formats 2a/2b are used for simultaneous transmission of the CQI and the ACK/NACK signal. When only the ACK/NACK signal is transmitted in a subframe, the PUCCH formats 1a/1b are used. When the SR is transmitted alone, the PUCCH format 1 is used. When the SR and the ACK/NACK are simultaneously transmitted, the PUCCH format 1 is used, and in this case, the ACK/NACK signal is modulated by using a resource allocated to the SR.

Now, a carrier aggregation system will be described. The carrier aggregation system is also called a multiple carrier system.

A 3GPP LTE system supports a case where a DL bandwidth and a UL bandwidth are differently configured under the premise that one component carrier (CC) is used. The 3GPP LTE system supports up to 20 MHz, and the UL bandwidth and the DL bandwidth may be different from each other. However, only one CC is supported in each of UL and DL cases.

Spectrum aggregation (also referred to as bandwidth aggregation or carrier aggregation) supports a plurality of CCs. For example, if 5 CCs are assigned as a granularity of a carrier unit having a bandwidth of 20 MHz, a bandwidth of up to 100 MHz can be supported.

One DL CC or a pair of a UL CC and a DL CC can correspond to one cell. Therefore, when a UE communicates with a BS through a plurality of DL CCs, it can be said that the UE receives a service from a plurality of serving cells.

Figure 6:
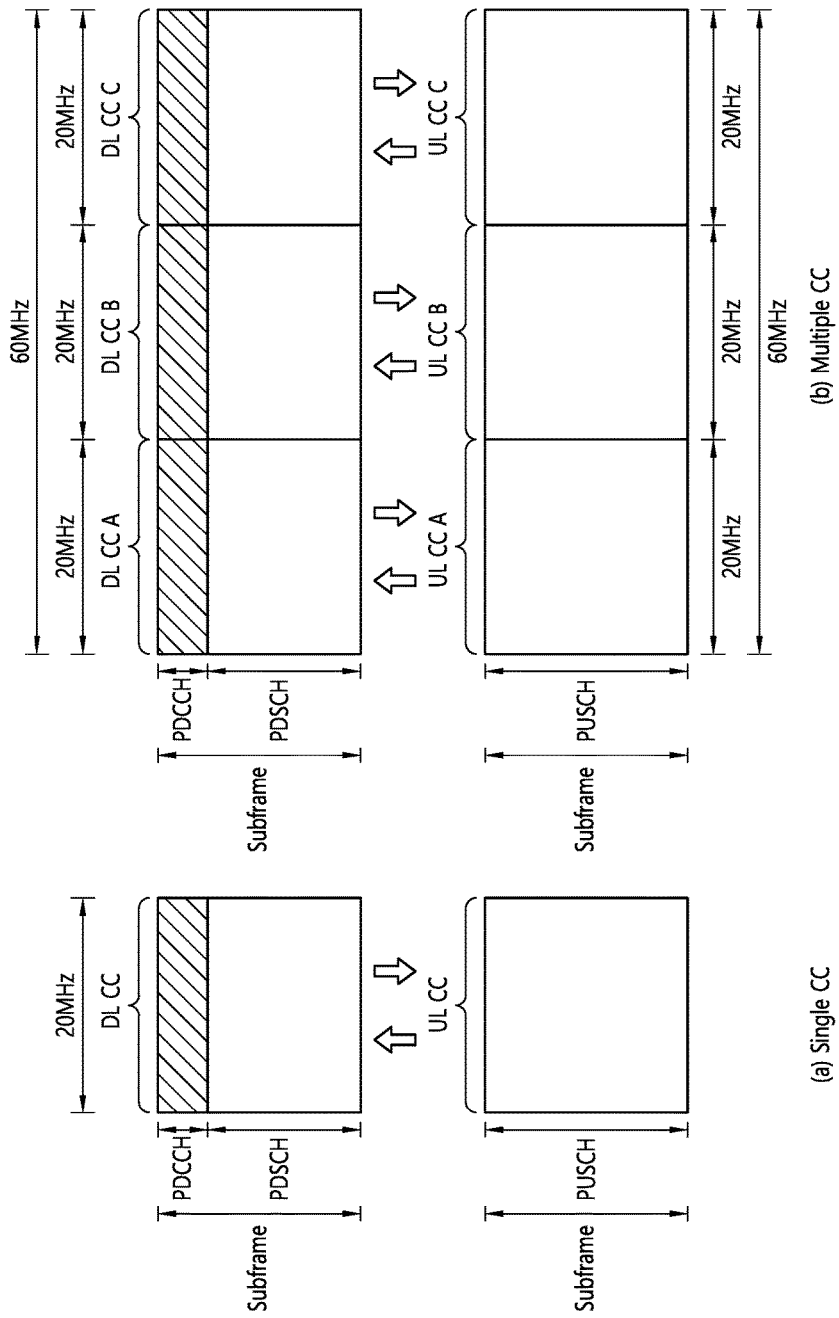
FIG. 6 shows an example of comparing a single carrier system and a carrier aggregation system.

FIG. 6 shows an example of comparing a single carrier system and a carrier aggregation system.

Although the carrier aggregation system (see FIG. 9(b)) has three DL CCs and three UL CCs, the number of DL CCs and the number of UL CCs are not limited thereto. A PDCCH and a PDSCH may be independently transmitted in each DL CC. A PUCCH and a PUSCH may be independently transmitted in each UL CC. Alternatively, the PUCCH may be transmitted only through a specific UL CC.

Since three DL CC-UL CC pairs are defined, it can be said that a UE receives a service from three serving cells.

The UE may monitor the PDCCH in a plurality of DL CCs, and may receive a DL transport block simultaneously via the plurality of DL CCs. The UE may transmit a plurality of UL transport blocks simultaneously via a plurality of UL CCs.

A pair of a DL CC #1 and a UL CC #1 may be a $1^{st}$ serving cell, a pair of a DL CC #2 and a UL CC #2 may be a $2^{nd}$ serving cell, and a DL CC #3 may be a $3^{rd}$ serving cell. Each serving cell may be identified by using a cell index (CI). The CI may be cell-specific or UE-specific.

The serving cell may be classified into a primary cell and a secondary cell. The primary cell is a cell designated as the primary cell when the UE performs an initial network entry process or starts a network re-entry process or performs a handover process. The primary cell is also called a reference cell. The secondary cell may be configured after an RRC connection is established, and may be used to provide an additional radio resource. At least one primary cell is configured always. The secondary cell may be added/modified/released by using higher-layer signaling (e.g., RRC messages). The CI of the primary cell may be fixed. For example, a lowest CI may be designated as a CI of the primary cell.

The carrier aggregation system may support cross-carrier scheduling. The cross-carrier scheduling is a scheduling method capable of performing resource allocation of a PDSCH transmitted by using a different CC through a PDCCH transmitted via a specific CC and/or resource allocation of a PUSCH transmitted via another CC other than a CC basically linked to the specific CC. That is, the PDCCH and the PDSCH may be transmitted through different DL CCs, and the PUSCH may be transmitted through a different UL CC other than a UL CC basically linked to a DL CC on which a PDCCH including a UL grant is transmitted. As such, in a system supporting the cross-carrier scheduling, a carrier indicator is required to report a specific DL CC/UL CC used to transmit the PDSCH/PUSCH for which the PDCCH provides control information. A field including the carrier indicator is hereinafter called a carrier indication field (CIF). Hereinafter, a scheduling carrier or a scheduling cell implies a carrier or serving cell for transmitting a UL grant or a DL grant, and a scheduled carrier or a scheduled cell implies a carrier or serving cell for receiving or transmitting a data channel by using the UL grant or the DL grant.

Non-cross carrier scheduling is a scheduling method extended from the conventional scheduling method. That is, it is a scheduling method in which a PDSCH and a PDCCH for scheduling the PDSCH are transmitted in the same DL CC. In addition, it is a scheduling method in which a PDCCH for scheduling a PUSCH is transmitted in a DL CC and a PUSCH is transmitted in a UL CC basically linked to the DL CC.

Now, the present invention is described.

First, several terms are defined. An intra-band is a term for describing a property within a certain frequency band. For example, when one carrier is 20 MHz an intra-band for the carrier may mean a band within the 20 MHz band. When a plurality of channels is disposed in the 20 MHz band, the plurality of channels may be described as being on an intra-band.

An inter-band is used to refer to different frequency bands. For example, when a first carrier and a second carrier each have a 20 MHz band and are spaced away from each other, a channel belonging to the first carrier and a channel belonging to the second carrier may be described as being on an inter-band.

Figure 7:
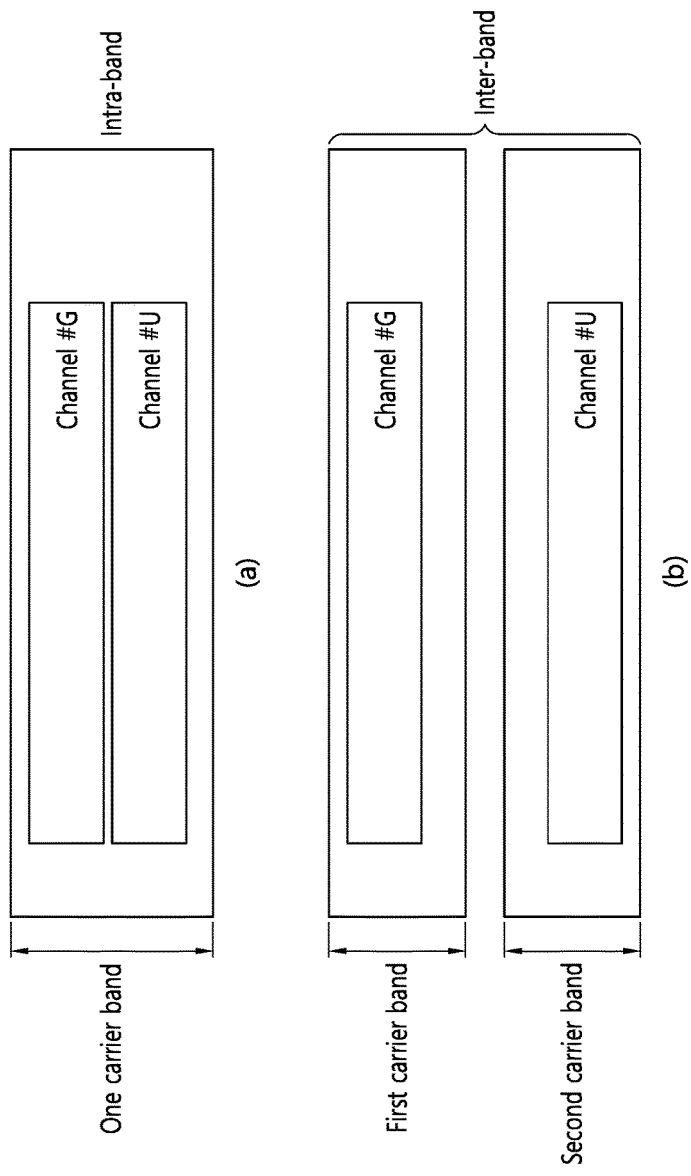
FIG. 7 shows channels on an intra-band and channels on an inter-band.

FIG. 7 shows channels on an intra-band and channels on an inter-band.

Referring to FIG. 7(a), channel #G and channel #U are adjacently disposed within one carrier band. in this case, channels #G and #U may be referred to as adjacent channels on an intra-band.

Referring to FIG. 7(b), channel #G is disposed in a first carrier band, and channel #U is disposed in a second carrier band. In this case, channels #G and #U may be channels on an inter-band.

Channel #G may be used by a BS or cell operated by a first operator, and channel #U may be used by a BS or cell operated by a second operator.

The present invention proposes a method and an apparatus for mitigating adjacent channel interference (hereinafter, referred to as ACI) when BSs or cells perform communications in different directions via adjacent channels on an intra-band.

ACI may occur when BSs (or cells) based on different operators apply different TDD UL-DL configurations (hereinafter, also referred to simply as UL-DL, configurations) on adjacent channels.

Figure 8:
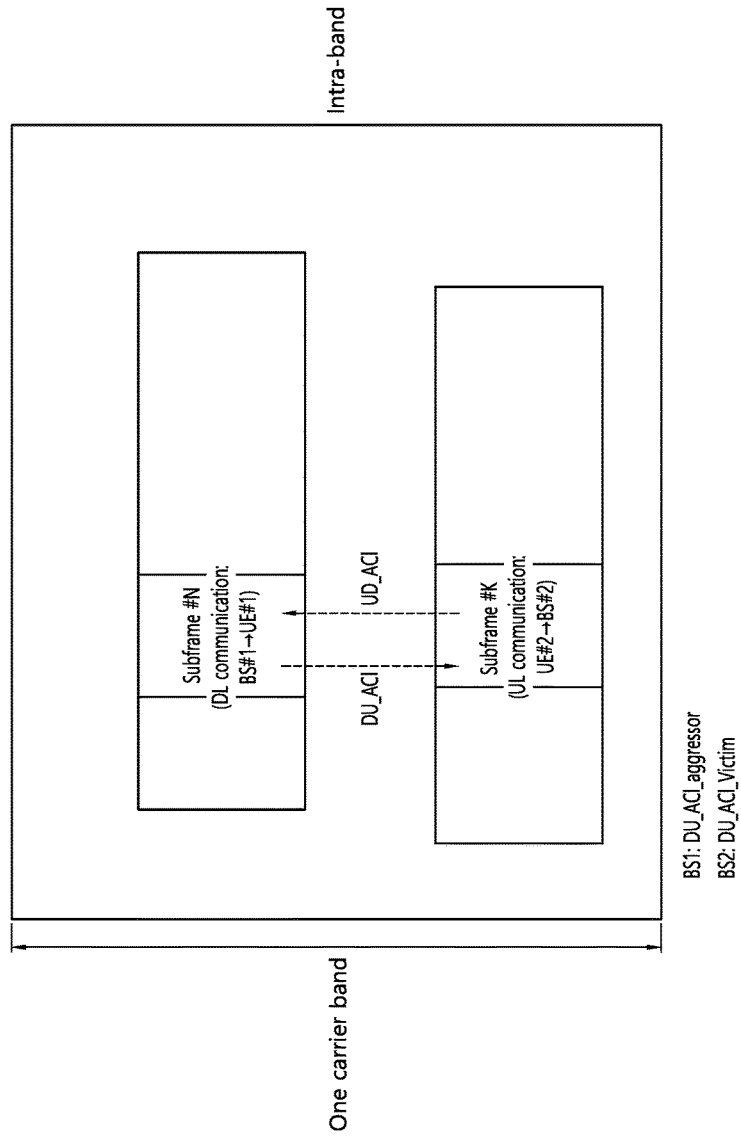
FIG. 8 illustrates ACI.

FIG. 8 illustrates ACI.

Referring to FIG. 8, operator #1-based BS #1 or cell #1 performs DL communication in subframe #N (SF #N) on channel #G. That is, BS #1 transmits a signal to UE #1. Operator #2-based BS #2 or cell #2 may perform UL communication in SF #K on adjacent channel #U. Here, SF #K may entirely or partly overlap SF #N. In this case, UL communication by BS #2 (or cell #2) (that is, UL communication in SF #K on channel #U) receives interference by DL communication by BS #1 (or cell #1) (that is, DL communication in SF #N on channel #G). Such interference is referred to as "DU_ACI."

In addition/on the contrary, DL communication by BS #1 (or cell #1) (that is, DL communication in SF #N on channel #G) receives interference by UL communication by BS #2 (or cell #2) (that is, UL communication in SF #K on channel #U), and such interference is referred to as "UD_ACI."

Hereinafter, for convenience of description, a BS (or cell) that causes DU_ACI is referred to as "DU_ACI_AGGRESSOR," and a BS (or cell) that receives DU_ACI is referred to as "DU_ACI_VICTIM." In the above example, BS #1 is a DU_ACI_AGGRESSOR, and BS #2 is a DU_ACI_VICTIM. in a network by the same operator, it is common not to use different TDD UL-DL configuration in an intra-band. However, when operators are different, it is impossible to exchange information with each other, and thus different TDD UL-DL configurations may be used on intra-band channels. A method and an apparatus for solving an ACI problem will be described below. For convenience of description, the present invention proposes schemes based on 3GPP LTE/LTE-A systems. However, the proposed schemes may also be applied to systems other than the 3GPP LTE/LTE-A systems.

[Proposed method #1] A DU_ACI_AGGRESSOR may obtain UL-DL configuration information applied by a DU_ACI_VICTIM and/or DL transmission power information through a predefined or signaled channel or DL subframe monitoring related to the detection of a CRS of the DU_ACI_VICTIM, a PSS/SSS, or a PSBCH/SIB.

Upon obtaining such information, the DU_ACI_AGGRESSOR may independently (or differently) set DL transmission power control/setting information to be used for a DL subframe set (thereof), which entirely or partly overlaps a subframe set used for the DU_ACI_VICTIM to perform DL communication, and DL transmission power control/setting information to be used for a DL subframe set (thereof), which entirely or partly overlaps a subframe set used for the DU_ACI_VICTIM to perform UL communication, in view of path loss or coupling loss between the DU_ACI_VICTIM and the DU_ACI_AGGRESSOR, which is estimated based on the predefined or signaled channel or a reference signal.

Figure 9:
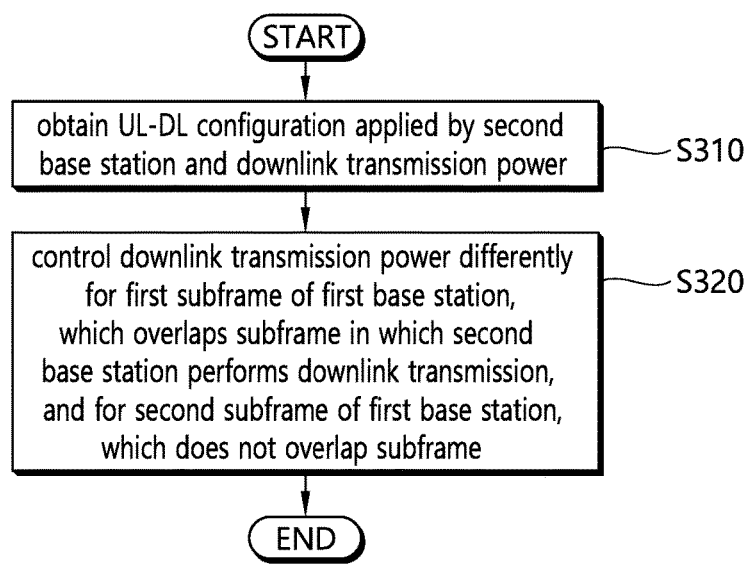
FIG. 9 shows an interference alleviation method of a first BS according to an embodiment of the present invention.

FIG. 9 shows an interference alleviation method of a first BS according to an embodiment of the present invention.

Referring to FIG. 9, the first BS obtains a UL-DL configuration applied by the second BS and DL transmission power (S310).

The first BS may differently control DL transmission power in a first subframe for the BS, which overlaps a subframe used for the second BS to perform DL transmission, and in a second subframe for the first BS, which does not overlap the subframe, thereby alleviating interference caused to the second BS (S320). The second subframe for the first BS may overlap a subframe used for the second BS to perform UL transmission.

For example, in a DL subframe set for the DL_ACI_AGGRESSOR (first BS), a first DL subframe may overlap a subframe used for the DU_ACI_VICTIM (second BS) to perform DL communication, and a second DL subframe may overlap a subframe used for the DU_ACI_VICTIM to perform UL communication. In this case, the DU_ACI_AGGRESSOR may independently perform DL transmission power control/setting for the first DL subframe and the second DL subframe. For example, the DU_ACI_AGGRESSOR (first BS) may set lower DL transmission power for the second DL subframe than for the first DL subframe, thereby reducing interference in UP communication of the DU_ACI_VICTIM (second BS).

The DU_ACI_AGGRESSOR may notify a UE through a predefined signal of information on DL subframe sets which different pieces of DL transmission power control/setting information are applied to or set for and/or different pieces of DL transmission power control/setting information for DL subframe sets (and/or UL-DL configuration information applied by the DU_ACI_VICTIM and/or DL transmission power information). The predefined signal may be an upper-layer signal, such as a radio resource control (RRC) message, UE-specific system information, scheduling information for a specific UE, and the like.

Upon receiving such information, the UE may perform cted CSI trteasurement and/or interference averaging operations by the DL subframe sets which different pieces of DL transmission power control/setting information are applied to (or set for). By applying proposed method #1, the DU_ACI_AGGRESSOR may reduce DU_ACI caused to the DU_ACI_VICTIM.

[Proposed method #2] A DU_ACI_VICTIM may obtain at least one of UL-DL configuration formation applied by a DU_ACI_AGGRESSOR and DL transmission power information through a predefined or signaled channel or DL subframe monitoring related to the detection of at least one of a CRS of the DU_ACI_AGGRESSOR, a PSS/SSS, and a PSBCH/SIB, Upon obtaining such information, the DU_ACI_VICTIM may independently (or differently) set UL transmission power control/setting information to be used for a UL subframe set (thereof), which entirely (or partly) overlaps a subframe set used for the DU_ACI_AGGRESSOR to perform. DL communication, and UL transmission power control/setting information to be used for a UL subframe set (thereof), which entirely (or partly) overlaps a subframe set used for the DU_ACI_AGGRESSOR to perform UL communication, in view of path loss (or coupling loss) between the DU_ACI_AGGRESSOR and the DU_ACI_VICTIM, which is estimated based on the predefined or signaled channel or a reference signal.

For example, the DU_ACI_VICTIM may notify a UE supported by the DU_ACI_VICTIM of a subframe used for the DU_ACI_AGGRESSOR to perform DL communication. When the UE performsUL transmission in a subframe overlapping the subframe, the DU_ACI_VICTIM may set higher transmission power for the subframe than for other subframes so that the UE transmits a signal.

The DU_ACI_VICTIM may notify a UE through a predefined signal of information on UL subframe sets which different pieces of UL transmission power control/setting information are applied to or set for and/or different pieces of UL transmission power control/setting informationfor UL subframe sets (for example, open-loop power control parameters or closed-loop power control parameters), and/or UL-DL configuration information applied by the DU_ACI_AGGRESSOR and/or DL transmission power information. By applying proposed method #2, the DU_ACI_VICTIM may overcome DU_ACI caused by the DU_ACI_AGGRESSOR.

[Proposed method #3] When proposed method #1 is applied, the DU_ACI_AGGRESSOR may set a predefined (or signaled) portion on a DL system band to be used as an additional guard band (hereinafter, referred to as "GB") in a particular DL subframe set which entirely or partly overlaps a subframe set used for the DU_ACI_VICTIM to perform UL communication.

Figure 10:
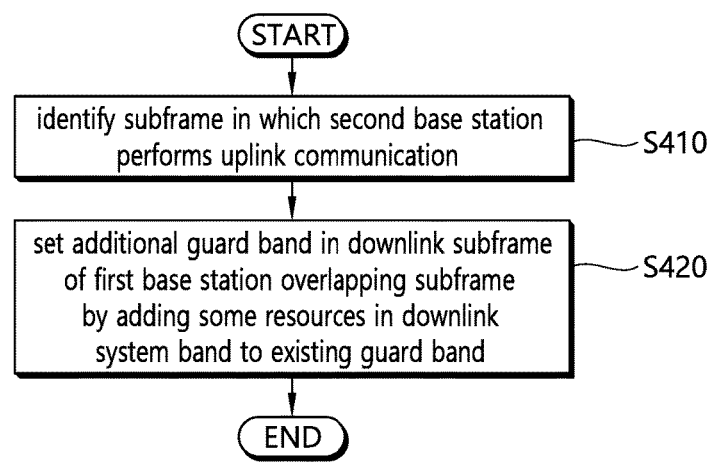
FIG. 10 shows an interference alleviation method according to proposed method #3.

FIG. 10 shows an interference alleviation method according to proposed method #3.

Referring to FIG. 10, a first BS identifies a subframe used for a second BS to perform UL communication (S410). The first BS add some resources in a DL system band to an existing GB to set an additional GB in a DL subframe for the first BS overlapping the subframe (S420).

It can be interpreted that setting/applying the GB does not change the value of a (DL) system band (that is, a channel band) but restricts a resource area for actually performing DL (data/control) information transmission (or scheduling) differently for each subframe set Additionally/alternatively, it can be interpreted that setting/applying the GB sets or changes the value of the (DL) system band differently for each subframe set.

The GB may be set using resources (for example, resource blocks) positioned at (opposite) edges of the (DL) system band, thereby reducing DU_ACI that is received by the DU_ACI_VICTIM or reaches the DU_ACI_VICTIM.

A reference signal (for example, a CRS or CSI-RS) used for RRM measurement and/or CSI measurement ansmitted only in the remaining (DL) system band excluding the GB on the DL subframe set in which the GB is set/applied. Alternatively, it can be assumed/defined that only a PDSCH and a (E)PDCCH are transmitted in the remaining (DL) system band excluding the GB and the reference signal used for RRM measurement and/or CSI measurement is transmitted in the entire (DL) system band. Alternatively, it can be assumed/defined that only a (E)PDCCH is transmitted in the entire (DL) system band.

When proposed method #2 is applied, the DU_ACI_VICTIM may set a predefined or signaled portion on a (UL) system band to be used as an additional GB in a particular UL subframe set which entirely or partly overlaps a subframe set used for the DU_ACI_AGGRESSOR to perform DL communication.

Figure 11:
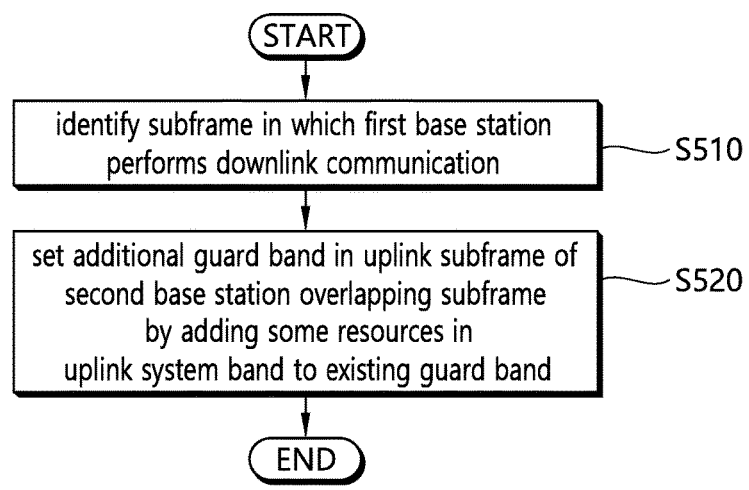
FIG. 11 shows another interference alleviation method according to proposed method #3.

FIG. 11 shows another interference alleviation method according to proposed method #3.

Referring to FIG. 11, a second BS (DU_ACI_VICTIM) may identify a subframe used for a first BS (DU_ACI_AGGRESSOR) to perform DL communication (S510), and may add some resources in a UL system band to an existing GB to set an additional GB in a UL subframe for the second BS (DU_ACI_VICTIM) overlapping the subframe (S520).

It can be interpreted that setting/applying the GB does not change the value of a (UL) system band (that is, a (UL) channel band) but restricts a resource area for actually performing UL (data/control) information transmission or scheduling differently for each subframe set and/or that setting/applying the GB sets or changes the value of the (UL) system band differently for each subframe set.

The GB may be set using resources (for example, resource blocks) positioned at (opposite) edges of the (UL) system band, thereby reducing UD_ACI that is received by the DU_ACI_AGGRESSOR (or reaches the DU_ACI_AGGRESSOR).

In proposed method #3, information on a subframe set to which independent or different GB setting information is applied and/or different GB setting information for each subframe set may be notified to a UE through a predefined signal. A GB may be set both by an aggressor and by a victim.

Figure 12:
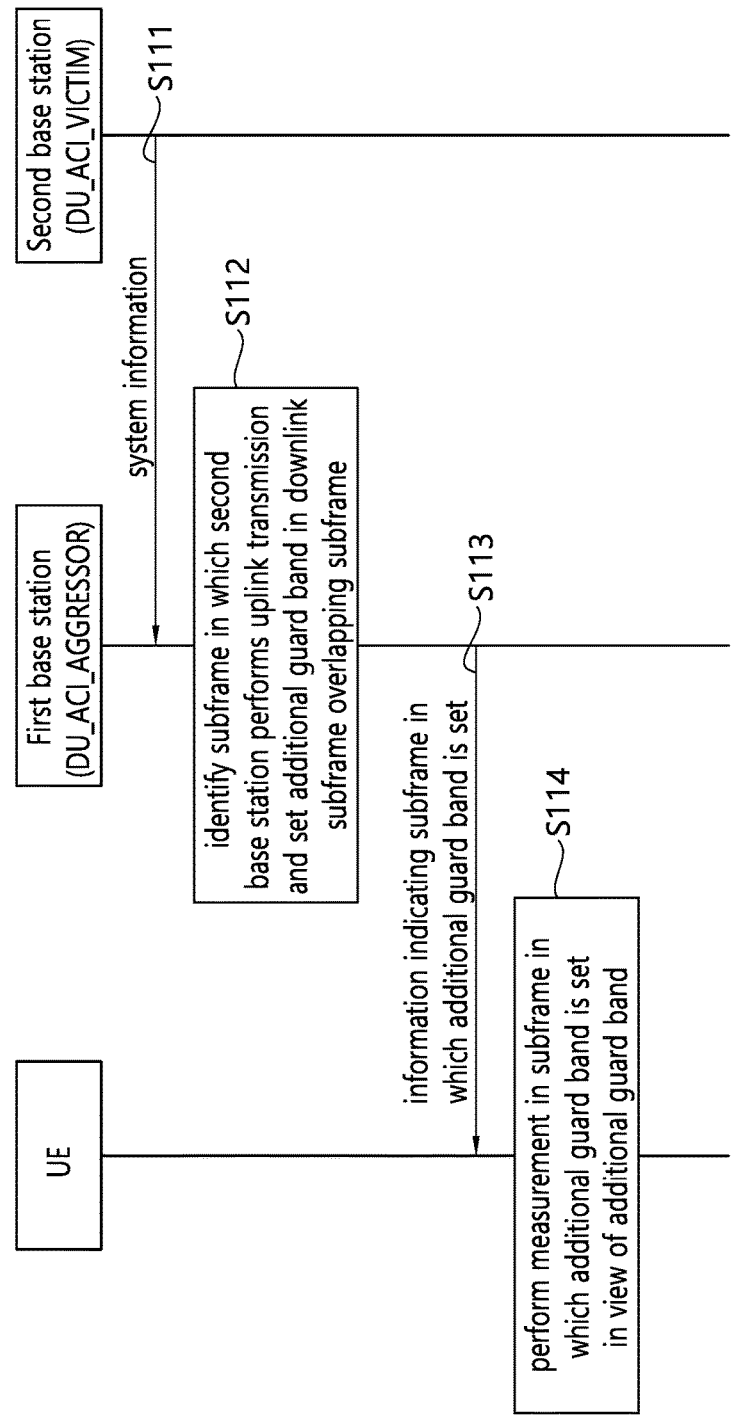
FIG. 12 shows an example of applying proposed method #3.
Figure 13:
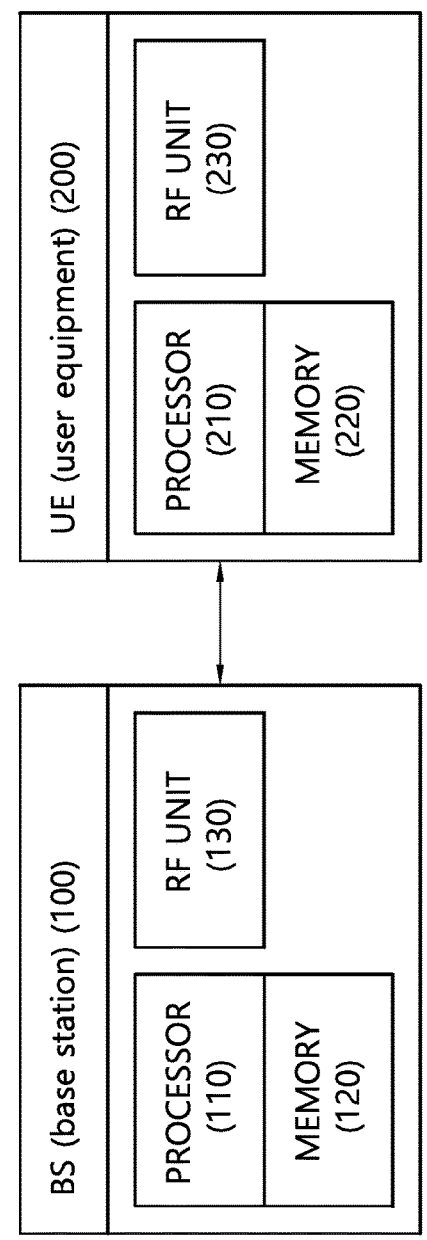
FIG. 13 is a block diagram showing a wireless device implementing an embodiment of the present invention.

FIG. 12 shows an example of applying proposed method #3.

Referring to FIG. 12, a first BS obtains system information from a second BS (S111), identifies a subframe used for the second BS to perform UL transmission, and sets an additional GB in a DL subframe overlapping the subframe (S112).

The first BS notifies a UE of the subframe in which the additional GB is set (S113), and the UE performs measurement in the subframe in which the additional GB is set in view of the additional GB (S114). For example, the UE may perform measurement using a CRS only in the remaining band, assuming that there is no cell-specific reference signal (CRS) in the additional GB.

it is apparent that examples of the proposed methods described above can also be included as one method to implement the present invention and thus can be regarded as proposed methods. In addition, the proposed methods described above may be implemented independently, and some of the proposed may be combined (or merged) to be implemented. Rules may be defined such that the proposed methods described above are restrictively applied only in a TDD system (and/or FDD system) environment. The proposed methods may be restrictively applied only when a DU_ACI_AGGRESSOR uses a predefined (or signaled) specific TDD UL-DL configuration (for example, a UL-DL configuration in which all of the ten subframes in a frame are DL subframes). The proposed methods can also be used in an extended manner even when sub-hands (sub-(system) bands) on the same band (system hand) are used for communications in different directions (for example, DL communication and UL communication).

FIG. 12 is a block diagram showing a wireless device implementing an embodiment of the present invention.

A BS 100 includes a processor 110, a memory 120, and a radio frequency (RF) unit 130. The processor 110 implements the proposed functions, procedure, and/or methods. The memory 120 is coupled to the processor 110, and stores a variety of information for driving the processor 110. The RF unit 130 is coupled to the processor 110, and transmits and/or receives a radio signal.

A UE 200 includes a processor 210, a memory 220, and an RF unit 230. The processor 210 implements the proposed functions, procedures, and/or methods. The memory 220 is coupled to the processor 210, and stores a variety of information for driving the processor 210. The RF unit 230 is coupled to the processor 210, and transmits and/or receives a radio signal.

The processors 110 and 210 may include an application-specific integrated circuit (ASIC), a separate chipset, a logic circuit, a data processing unit, and/or a converter for mutually converting a baseband signal and a radio signal. The memories 120 and 220 may include a read-only memory (ROM), a random access memory (RAM), a flash memory, a memory card, a storage medium, and/or other equivalent storage devices. The RF units 130 and 230 may include one or more antennas for transmitting and/or receiving a radio signal. When the embodiment of the present invention is implemented in software, the aforementioned methods can be implemented with a module (i.e., process, function, etc.) for performing the aforementioned functions. The module may be stored in the memories 120 and 220 and may be performed by the processors 110 and 210. The memories 120 and 220 may be located inside or outside the processors 110 and 210, and may be coupled to the processors 110 and 210 by using various well-known means.

What is claimed is:

1. A method for alleviating, by a first base station (BS), interference in a wireless communication system comprising the first BS and a second BS that use adjacent resources, the method comprising:
    obtaining an uplink-downlink configuration applied by the second BS; and
    determining downlink transmission power differently for a first subframe of the first BS, which overlaps a subframe used for the second BS to perform downlink transmission, and for a second subframe of the first BS, which does not overlap the subframe,
    wherein the first BS identifies a particular subframe used for the second BS to perform uplink communication, and sets an additional guard band in a downlink subframe of the first BS overlapping the particular subframe by adding resources in a downlink system band to an existing guard band.

2. The method of claim 1, wherein the first BS performs uplink transmission in the first subframe.

3. The method of claim 2, wherein the first BS allocates lower uplink transmission power for the first subframe than for the second subframe to alleviate interference caused to the second BS.

4. The method of claim 1, wherein the first BS identifies a subframe used by the second BS to perform uplink communication or downlink communication through the obtained uplink-downlink configuration applied by the second BS.

5. The method of claim 1, further comprising:
identifying a particular subframe used by the second BS to perform downlink communication; and
setting an additional guard band in an uplink subframe of the first BS overlapping the particular subframe by adding resources in an uplink system band to an existing guard band.

6. The method of claim 1, wherein the first BS provides a user equipment (UE) with information indicating a subframe in which an additional guard band is set.

7. The method of claim 6, wherein the UE performs a measurement in the subframe in which the additional guard band is set, assuming that no cell-specific reference signal is allocated in the additional guard band.

8. The method of claim 1, wherein the first BS and the second BS are operated by different operators.

9. The method of claim 1, wherein the first BS transmits a cell-specific reference signal (CSR) only in a band of the downlink subframe other than the additional guard band.

10. A first base station (BS) comprising:
a transceiver; and
a processor, operatively connected to the transceiver, wherein the processor is configured to:
obtain an uplink-downlink configuration applied by a second BS; and
determine downlink transmission power differently for a first subframe of the first BS, which overlaps a subframe used for the second BS to perform downlink transmission and for a second subframe of the first BS, which does not overlap the subframe,
wherein the first BS identifies a particular subframe used for the second BS to perform uplink communication, and sets an additional guard band in a downlink subframe of the first BS overlapping the particular subframe by adding resources in a downlink system band to an existing guard band.

11. The first BS of claim 10, wherein the first BS transmits a cell-specific reference signal (CSR) only in a band of the downlink subframe other than the additional guard band.

* * * * *